(12) United States Patent
Ciudaj

(10) Patent No.: US 11,818,989 B2
(45) Date of Patent: Nov. 21, 2023

(54) IRRIGATION DEVICE FOR PROMOTING DEEP ROOT GROWTH OF A PLANT

(71) Applicant: DEEP ROOT IRRIGATION, LLC, Burlington, IA (US)

(72) Inventor: Jeffrey Ciudaj, Burlington, IA (US)

(73) Assignee: Deep Root Irrigation, LLC, Burlington, IA (US)

( * ) Notice: Subject to any disclaimer, the term of this patent is extended or adjusted under 35 U.S.C. 154(b) by 0 days.

(21) Appl. No.: 17/516,513

(22) Filed: Nov. 1, 2021

(65) Prior Publication Data

US 2023/0138298 A1    May 4, 2023

(51) Int. Cl.
*A01G 29/00* (2006.01)
*A01G 27/00* (2006.01)

(52) U.S. Cl.
CPC .................................. *A01G 29/00* (2013.01)

(58) Field of Classification Search
CPC .... A01G 27/006; A01G 27/008; A01G 25/06; A01G 25/16; A01G 29/00; E21B 41/00
USPC ......................................................... 47/48.5
See application file for complete search history.

(56) References Cited

U.S. PATENT DOCUMENTS

| | | | |
|---|---|---|---|
| 587,779 A | 8/1897 | Barker | |
| 1,280,486 A | 3/1917 | Kanst | |
| 2,083,153 A | 1/1936 | Irish | |
| 2,127,175 A | 8/1938 | Duering | |
| 2,145,934 A * | 2/1939 | Kingman | A01C 21/00 |
| | | | 405/50 |
| 2,790,403 A | 4/1957 | Larsen | |
| 3,426,544 A | 2/1969 | Curtis | |
| 3,587,972 A | 6/1971 | Weeth | |
| 3,672,571 A | 6/1972 | Goodricke | |
| 3,900,962 A | 8/1975 | Chan | |
| 4,162,041 A | 7/1979 | Shinichi | |
| 4,188,154 A * | 2/1980 | Izatt | A01G 25/06 |
| | | | 405/38 |
| 4,453,343 A | 6/1984 | Grimes | |
| 5,168,664 A * | 12/1992 | Deutschmann, Sr. | |
| | | | A01G 27/008 |
| | | | 47/79 |
| 5,310,281 A | 5/1994 | Elena | |

(Continued)

FOREIGN PATENT DOCUMENTS

| | | |
|---|---|---|
| AU | 2002300497 | 3/2002 |
| AU | PS08-9202 | 3/2002 |

(Continued)

OTHER PUBLICATIONS

The International Searching Authority, International Search Report, dated Dec. 15, 2022, 12 pages, United States.

(Continued)

*Primary Examiner* — Brady W Frazier
*Assistant Examiner* — Zoe Tam Tran
(74) *Attorney, Agent, or Firm* — Kevin Schraven; Heber Martin Carbajal; Hankin Patent Law, APC

(57) ABSTRACT

The present disclosure is an irrigation device for promoting the deep root growth of a plant. The irrigation device may comprise a tube and a hose, wherein the hose may have one or more slits that allow liquid to seep out if the water pressure in the hose is too high. The water pressure may get too high if the pores of the soaker hose become temporarily clogged, which may happen if a fertilizer solution is put into the irrigation system.

20 Claims, 1 Drawing Sheet

(56) References Cited

U.S. PATENT DOCUMENTS

| | | | |
|---|---|---|---|
| 5,694,716 A | 12/1997 | Bible | |
| 5,761,846 A | 6/1998 | Marz | |
| 5,938,372 A | 8/1999 | Lichfield | |
| 5,975,797 A | 11/1999 | Thomas | |
| 5,996,279 A | 12/1999 | Zayeratabat | |
| 6,185,864 B1* | 2/2001 | Lee | A01G 9/083 47/9 |
| 6,260,769 B1 | 7/2001 | Hoover | |
| 6,394,368 B1 | 5/2002 | Hintz | |
| 6,443,367 B1 | 9/2002 | Bova | |
| 6,453,607 B1* | 9/2002 | Dewey | A01G 29/00 47/48.5 |
| 6,540,436 B2 | 4/2003 | Ogi | |
| 7,225,585 B2 | 6/2007 | Zayeratabat | |
| 8,065,832 B2 | 11/2011 | King | |
| 8,132,362 B2 | 3/2012 | King | |
| 8,381,437 B2 | 2/2013 | Ciudaj | |
| 9,609,812 B2 | 4/2017 | Ciudaj | |
| D833,238 S | 11/2018 | Ciudaj | |
| 2003/0163956 A1 | 9/2003 | Staples | |
| 2003/0196375 A1 | 10/2003 | Ferro | |
| 2008/0005960 A1 | 10/2008 | King | |
| 2009/0313893 A1* | 12/2009 | McIntyre | A01G 29/00 47/79 |
| 2011/0056128 A1 | 3/2011 | King | |
| 2011/0219684 A1 | 9/2011 | Ciudaj | |
| 2014/0020290 A1* | 1/2014 | Zinger | A01G 29/00 47/48.5 |
| 2015/0313101 A1* | 11/2015 | Wang | A01G 29/00 47/48.5 |
| 2015/0373934 A1 | 12/2015 | Ciudaj | |
| 2016/0165819 A1 | 6/2016 | Ciudaj | |
| 2020/0267916 A1* | 8/2020 | Sol | A01G 27/001 |

FOREIGN PATENT DOCUMENTS

| | | |
|---|---|---|
| AU | 2007260876 | 12/2007 |
| CN | 101472467 | 3/2012 |
| CN | 206713674 | 12/2017 |
| CN | 207692594 | 8/2018 |
| CN | 213695140 | 7/2021 |
| KR | 20190082466 | 7/2019 |
| WO | 2007150050 | 12/2007 |
| WO | 2007150050 A2 | 12/2007 |
| WO | 2007150050 A3 | 12/2007 |
| WO | 2011066229 | 6/2011 |
| WO | 2015199756 A1 | 12/2015 |

OTHER PUBLICATIONS

The International Searching Authority, International Search Report, dated Apr. 27, 2015, 13 pages, United States.

The International Searching Authority, Written Opinion of the International Searching Authority, dated Apr. 27, 2015, 13 pages, United States.

* cited by examiner

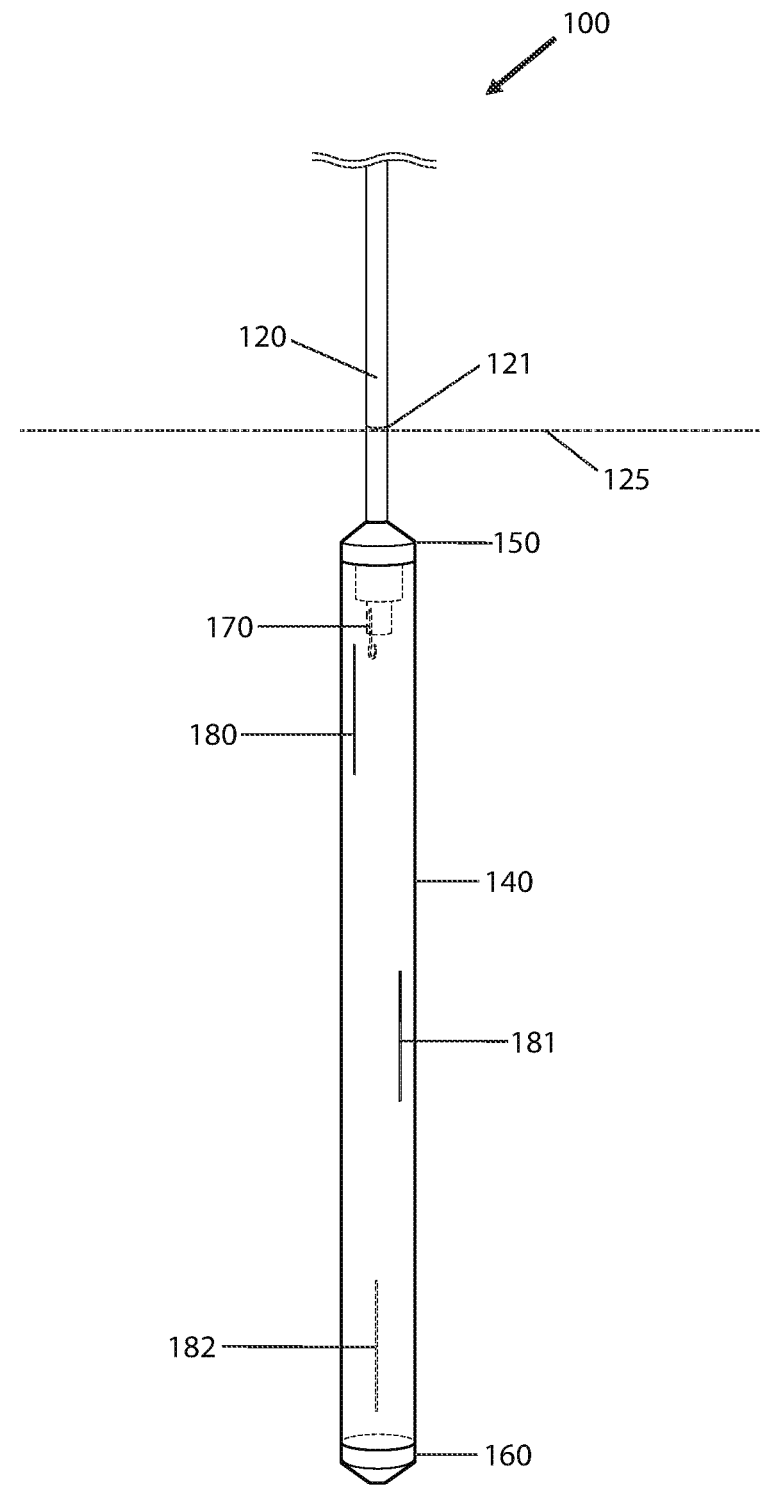

IRRIGATION DEVICE FOR PROMOTING DEEP ROOT GROWTH OF A PLANT

FIELD OF THE PRESENT DISCLOSURE

The present disclosure relates generally to a device for promoting the downward growth of the roots of a plant. More particularly, the present disclosure generally relates to a device that provides deep root watering and fertilizing of a plant and promotes the growth of the roots of a plant deeper into the ground. The device may be adapted to couple with an existing irrigation drip line system and may repel the roots of the plant away from the device, so that the strengthened roots are hindered from damaging the device.

BACKGROUND

For thousands of years, farmers and, more specifically, viticulturists have generally been irrigating plants and vines to provide for a controlled and consistent growth in the face of inconsistent weather patterns. More recently, farmers have also adopted a system of drip irrigation that generally allows each and every vine in a field to be individually watered efficiently without water wasting sprinklers. However, this drip irrigation system typically provides water only the top of the soil, which generally fails to penetrate deep into the soil. As a result, roots of the vines or plants remain near the surface of the soil, rather than burrowing deep down into the soil, as preferred for a healthy and hardy plant. When a vine or plant has deep roots, the plant is usually better able to find its own supply of water in the lower water table. This in turn allows the plant to survive harsh weather conditions, such as extreme cold, extreme heat, flooding, or drought.

One device that provides for deeper growth of roots through irrigation is disclosed in U.S. Pat. No. 8,381,437 ("the '437 Patent"), issued to Jeffrey Ciudaj, who is the same inventor of the present disclosure. The contents of the '437 Patent are expressly incorporated herein by this reference as though set forth in their entirety. The '437 Patent discloses a device and method for providing irrigation water to a plant that promotes the growth of the roots of the plant deep into the soil. The irrigation device disclosed in the '437 Patent may also couple to an existing irrigation drip line system that previously provided water to the plant and may repel the roots of the plant away from the apparatus. This will preferably prevent the roots of the plant from intruding into the hose of the irrigation device and thus prevent damaging to the irrigation device.

Another device that provides deeper growth of roots through irrigation is disclosed in U.S. Pat. No. 9,609,812 ("the '812 Patent"), also issued to Jeffrey Ciudaj, who is the same inventor of the present disclosure. The contents of the '812 Patent are expressly incorporated herein by this reference as though set forth in their entirety. The '812 Patent discloses an irrigation device for promoting deep root growth of a plant. The irrigation device disclosed in the '812 Patent may also comprise one or more copper elements or a copper coating and may repel the roots of the plant away from the apparatus. This will preferably prevent the roots of the plant from intruding into the hose of the irrigation device and thus prevent damaging to the irrigation device.

Although the '437 Patent and '812 Patent are vast improvements over standard irrigation systems, the present disclosure presents important, novel, and non-obvious improvements to the '437 Patent and '812 Patent. For example, the '437 Patent fails to disclose an irrigation system that would deter rodents and other pests seeking water from gnawing on the hoses of the irrigation system. The '437 Patent also does not include additional features that would help simplify the measuring of the tubing when installing of the irrigation device into the ground. While the root irrigation system of the '437 Patent helps repel roots of a plant from growing into the tube of the irrigation system, the root irrigation system does not prevent root growth towards the hose in its entirety. The '812 Patent does not include features allowing for heavier liquid fertilizer to be mixed with the water to be dispensed from the system. Thus, it would be beneficial to provide a new and improved irrigation device that promotes growth to a root to a plant while allowing heavier liquid fertilizer and like compounds to be released from the system.

Thus, what is needed is a new and improved, efficient plant root irrigation system that allows the distribution of fertilizers.

SUMMARY

To minimize the limitations in the prior art, and to minimize other limitations that will become apparent upon reading and understanding the present specification, the following discloses a new and improved irrigation device for providing irrigation water to roots of a plant.

One embodiment may be an irrigation device comprising: a tube and a hose. At least a portion of a distal end of the tube extends into and is substantially surrounded by the hose. The tube passes through a first end of the hose and the first end of the hose is closed, such that the distal end of the tube is kept substantially in place and such that liquid exiting from the distal end of the tube is substantially prevented from passing out of the first end of the hose. A second end of the hose is closed, such that the liquid is substantially prevented from passing out of the second end of the hose. The hose has a plurality of pores that allow the liquid to pass through to outside of the hose at a standard flow rate. The hose further comprises one or more fluting cuts that allow the liquid to seep out of the hose through the one or more fluting cuts when a liquid pressure within the hose is greater than the standard flow rate. The tube is configured to connect to an irrigation system such that the tube receives the liquid from the irrigation system.

Another embodiment may be an irrigation device comprising: a tube, a hose, and a copper pin. At least a portion of a distal end of the tube extends into and is substantially surrounded by the hose. The tube passes through the first end of the hose and the first end of the hose is closed, such that the distal end of the tube is kept substantially in place and such that the liquid exiting from the distal end of the tube is substantially prevented from passing out of the first end of the hose. At least a portion of a distal end of the tube extends into and is substantially surrounded by the hose. The tube passes through a first end of the hose and the first end of the hose is closed, such that the distal end of the tube is kept substantially in place and such that the liquid exiting from the distal end of the tube is substantially prevented from passing out of the first end of the hose. A second end of the hose is closed, such that the liquid is substantially prevented from passing out of the second end of the hose. The hose has a plurality of pores that allow the liquid to pass through to outside of the hose at a standard flow rate. The hose further comprises one or more fluting cuts that allow the liquid to seep out of the hose through the one or more fluting cuts when a liquid pressure within the hose is greater than the standard flow rate. The tube is configured to connect to an irrigation system such that the tube receives the liquid from the irrigation system. The copper pin is substantially confined within the hose. Another embodiment may be an irrigation device comprising a tube and a hose. At least a portion of a distal end of the tube extends into and is substantially surrounded by the hose. The tube passes through a first end of the hose and the first end of the hose is closed, such that the distal end of the tube is kept substantially in place and such that the liquid exiting from the distal end of the tube is substantially prevented from passing out of the first end of the hose. A second end of the hose is closed, such that the liquid is substantially prevented from passing out of the second end of the hose. The hose has a plurality of pores that allow the liquid to pass through to outside of the hose at a standard flow rate. The hose further comprises one or more fluting cuts that allow the liquid to seep out of the hose through the one or more fluting cuts when a liquid pressure within the hose is greater than the standard flow rate and the tube is configured to connect to an irrigation system such that the tube receives the liquid from the irrigation system. The tube comprises one or more measurement marks.

It is an object to provide a methods and devices for encouraging the growth of plants roots in a downward direction deeper into the soil.

It is another object to incorporate an existing irrigation system with the watering apparatus device and/or enhanced watering method.

It is another object to provide an irrigation system that saves and preserves water.

It is another object to provide an irrigation system to help increase the efficiency of water distribution.

It is another object to provide an irrigation system that would deter rodents and other pests from gnawing on the hoses of the irrigation system.

It is another object to provide an irrigation system that would help simply the installation of the irrigation device when installing the device into the ground.

It is another object to provide an irrigation system that would prevent root growth towards the entire hose or portions thereof.

It is another object to provide an irrigation system that is organic compliant.

It is another object to provide an irrigation system that allows for heavy liquid fertilizer to be dispersed through the irrigation system.

It is yet another object to overcome the limitations of the prior art.

Other features and advantages are inherent in the irrigation device claimed and disclosed will become apparent to those skilled in the art from the following detailed description and its accompanying drawings.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

FIG. 1 is an illustration of a perspective view of one embodiment of the irrigation device.

DETAILED DESCRIPTION OF THE ILLUSTRATIVE EMBODIMENTS

In the following detailed description of various embodiments of the present disclosure, numerous specific details are set forth in order to provide a thorough understanding of various aspects of one or more embodiments of the present disclosure. However, one or more embodiments of the present disclosure may be practiced without some or all of these specific details. In other instances, well-known methods, procedures, and/or components have not been described in detail so as not to unnecessarily obscure aspects of embodiments of the present disclosure.

While multiple embodiments are disclosed, still other embodiments of the present disclosure will become apparent to those skilled in the art from the following detailed description, which shows and describes illustrative embodiments of the present disclosure. As will be realized, the device of the present disclosure is capable of modifications in various obvious aspects, all without departing from the spirit and scope of the present disclosure. Accordingly, the screen shot FIGURES, and the detailed descriptions thereof, are to be regarded as illustrative in nature and not restrictive. Also, the reference or non-reference to a particular embodiment of the present disclosure shall not be interpreted to limit the scope of the present disclosure.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 15% of the indicated number or range of numbers. In one embodiment, the term "approximately" and "about", refer to a deviance of between 0.0001-40% from the indicated number or range of numbers.

FIG. 1 is an illustration of a perspective view of one embodiment of the irrigation device. As shown in FIG. 1, one embodiment of the irrigation device 100 may comprise: a tube 120, a hose 140, a first end cap 150, a second end cap 160, and one or more fluting cuts 180, 181, 182. The tube 120 may be adapted to couple to another tube of an existing irrigation drip line emitter via a coupler or connector in order to receive water from a water source. It is also contemplated that that the irrigation device 100 may be integrated or combined with any source of water or other nutrient providing system. Importantly, FIG. 1 also shows that the distal end of the tube 120 may comprise a copper pin 170.

In one embodiment, the tube 120 (or irrigation drip line emitter tube) may be a ¼" irrigation line of various lengths. Additionally, the tube irrigation drip line emitter may be couple to—or otherwise be part of—an existing irrigation drip line emitter. The hose 140 may be a soaker hose, mesh, sheath, or shroud. The hose 140 may also be adjusted in various lengths.

In one embodiment, the tube 120 may be a ¼" irrigation line of a length such that the tube 120 is substantially near the first end or upper end of the hose 140. Furthermore, the distal end of the tuber 120 may comprise a copper pin 170 that may also be substantially near the top end of the hose 140.

When the irrigation system 100 is coupled to a source of water such as a drip line emitter, and when that source of water is activated, water may travel from the source of water and may pass through the second end or lower end of the tube 120, and fill inside the hose 140. In other various embodiments, the water may also pass through any valves, if needed, which may regulate the water flow. The valves, if any, may also prevent the back flow of water. The tube 120 may be constructed from an natural or man-made material, including, but not limited to High-Density Polyethylene ("HDPE"), Medium-Density Polyethylene ("MDPE"), copper, iron, or lead pipes, thermoplastic polymers like Polyvinyl chloride ("PVC"), Chlorinated polyvinyl chloride ("CPVC"), Acrylonitrile butadiene styrene ("ABS"), cross-linked polyethylene ("PEX plastic") pressure pipes, or any other similar material that can assist to resist mold, corrosion, and weather damage. If desired, a pressure control valve may also be installed to regulate water pressure and help prevent excessive pressure from harming the irrigation system.

In one embodiment, the one or more fluting cuts 180, 181, 182 may be cut with a razor type cutter and configured such that the one or more fluting cuts 180, 181, 182 are substantially invisible at a normal water pressure. When the water pressure inside of hose 140 builds to a certain point, the one or more fluting cuts 180, 181, 182 may open slightly such that the water and heavier materials mixed in with the water may exit and flow through the one or more fluting cuts 180, 181, 182. Thus, the fluting cuts 180, 181, 182 may act as a pressure relief for when the normal pores of the soaker hose become temporarily clogged or cannot otherwise handle the volume of liquid flowing into the hose 140. The heavier materials mixed in with the water, may, for example, comprise heavy liquid fertilizers and/or other types of fertilizers.

In one embodiment, there may be three fluting cuts 180, 181, 182 that are placed advantageously along the hose at various intervals in order to provide optimal liquid flow from the irrigation system 100 into the surrounding ground. For example, the first fluting cut 180 of the three fluting cuts 180, 181, 182 may be positioned approximately ½" (inch) from the first end or upper end of the hose 140. The first fluting cut 180 may then extend downwards lengthwise, toward to second end or lower end of the hose 140. The first fluting cut 180 may extend downwards lengthwise approximately 1" (inch) such that the first fluting cut 180 starts at approximately ½" (inch) from the first end of upper end of the hose 140 and end at approximately 1½" (inches) from the first end or upper end of the hose 140.

In addition to the first fluting cut 180, there may be a second fluting cut 181 of the three fluting cuts 180, 181, 182. The second fluting cut 181 may be positioned approximately the middle of the hose 140. Additionally, the second fluting cut 181 may be positioned such that it is rotated ⅓ of the circumference of the hose 140 from the first fluting cut 180. The second fluting cut 181 may then extend downwards lengthwise, toward to second end or lower end of the hose 140. The second fluting cut 181 may extend downwards lengthwise approximately 1" (inch) such that the second fluting cut 181 starts at approximately the middle of the hose 140 and ends at approximately 1" (inch) from the middle of the hose 140.

In addition to the first and second fluting cuts 182 of the three fluting cuts 180, 181, 182, there may be a third fluting cut 1802 of the three fluting cuts 180, 181, 182. The third fluting cut 182 may be positioned approximately ½" (inch) from the second end or lower end of the hose 140. The third fluting cut 182 may then extend upwards lengthwise toward the first end or upper end of the hose 140. Additionally, the third fluting cut 182 may be positioned such that it is rotated ⅓ of the circumference of the hose 140 from both the first fluting cut 180 and the second fluting cut 181. The third fluting cut 182 may extend upwards lengthwise approximately 1" (inch) such that the third fluting cut 182 starts at approximately ½" (inch) from the second end of lower end of the hose 140 and ends at approximately 1½" (inches) from the second end or lower end of the hose 140. With all three fluting cuts 180, 181, 182 distributed evenly across the circumference and the length of the hose 140, the irrigation device 100 may evenly distribute water throughout the entire length and circumference of the hose 140.

The irrigation device 100 may be assembled and then placed in a hole in the ground adjacent to the plant or vine to be irrigated. The hole in the ground may be a deep and substantially vertical hole that can accommodate the length of the hose 140 and tube 120. The irrigation device 100 also may be buried deep enough, so that roots of the plant being irrigated will strive to get to the water provided by device 100.

In one embodiment, the copper pin 170 may be positioned at the second end or lower end of the tube 120 and may be near the upper end of the hose 140. In addition to repelling roots from growing towards and into tube 120, the copper pin 170 may also function as a catalyst in photosynthesis and respiration. By incorporating copper pin 170, the roots of a plant that the irrigation device 100 is watering may be deterred from growing towards the irrigation device 100 and choking the irrigation device 100. In a preferred embodiment, the copper pin 170, which may be located approximately at the bottom or second end of the tube 120, as shown in FIG. 1, may also substantially prevent the roots of the plant from damaging the hose 140 and tube 120, or from clogging the water supply exiting the fluting cuts 180.

The hose 140 may be a soaker hose, sheath, mesh, shroud, liquid-permeable membrane, or other type of perforated hollow hose that comprises small holes or perforations, which may allow the water to seep out of the hose 140 as it travels up the length of the hose 140. Specifically, the water may pass through the tube 120, and/or tube of the irrigation drip line emitter and may begin to fill the hose 140. Once the hose 140 has enough water or liquid to cause a high water pressure, the one or more of the fluting cuts 180, 181, 182 may open, enabling water to flow out of the hose 140 and into the ground surrounding the hose 140. The water generally first seeps out of the hose 140 at the deepest part of the hose 140. If the water exits the tube 120 at a sufficiently high flow rate, then the water, in addition to seeping out of the third fluting cut 182 of the hose 140 at the bottom, may travel upwards along the length of the hose and may form a column of water around the device 100. Generally, the hose 140 will have more water seeping out of the bottom and less water seeping out of the top when water is flowing.

Preferably, the hose 140 has a plurality of pores that allow the liquid to pass through to outside of said hose 140 at a standard flow rate. The standard flow rate of the soaker hose 140 is the rate that water exits the hose without have the water pressure build up such that the sides of the hose 140 are stretched and put under undue pressure. The fluting cuts 180, 181, 182 may allow the liquid to seep out of said hose 140 when a liquid pressure within the hose 140 is greater than said standard flow rate of the hose 140.

The hose 140 may comprise a first end cap 150, which is generally configured to couple the tube 120 to the hose 140 and may be used to plug, stop, or cap the first end or upper end of the hose 140 to prevent water from exiting out of the top of the hose 140 and gushing upwards. In the embodiment shown in FIG. 1, the first end cap 150 may be a ribbed and/or cylindrical end cap that allows the tube 120 to pass through the hose 140 and plug the hose 140. On the other hand, the second end cap 160 may be configured to stop or cap the lower end of the hose 140 to force water to exit out of the one or more fluting cuts 180, 181, 182. Like the first end cap 150, the second end cap 160 may also be a ribbed and/or cylindrical end cap that stops and plugs at the bottom end of the hose 140, as shown in FIG. 1. Alternatively, the hose 140 may simply be tied off, sealed, glued, crimped, or otherwise plugged, to prevent the water from exiting out the end of the hose 140. Although FIG. 1 shows that end caps may be used to close or seal the upper end and lower end of the hose 140, the irrigation device 100 may lack end caps and instead have the ends of the hose 140 sealed by any other means.

The water or liquid may first exit the hose 140 out of the one or more fluting cuts 180, 181, 182, and depending upon how much liquid is provided to the irrigation device 100, the water/liquid pressure may build, causing the one or more fluting cuts 180, 181, 182 to open slightly and allow more liquid to exit the hose 140. When the irrigation device 100 is first installed, more water may be provided, so that the roots of a plant sense the water and begin growing deeper immediately. A column of water saturating the soil may be created along the hose 140, which may allow the roots to grow downwards to and through the saturated soil and towards the hose 140. In a preferred embodiment, the saturated column of soil preferably never reaches the surface of the soil, thereby preventing loss of water to evaporation. Additionally, the copper pin 170 may be placed near the lowest position in the tube 120.

When the irrigation device 100 is placed inside a hole in the ground, the hole may be back filled with an aerating composition, such as gravel or sand to provide additional aeration of the soil. The hole in the ground may also be backfilled with any composition, so long as the irrigation device 100 is held in substantially in place and may provide water to plant being irrigated.

When the irrigation device 100 is used, a moist column of soil may be created that is substantially deeper and more effective than what can be created by a standard drip irrigation system or sprinkler system. By creating deeper roots, the plant may be able to better survive harsh weather, such as extreme heat, cold, unseasonable weather, drought, flooding, or excessive rainfall. Plants without deep roots are much less likely to survive harsh weather.

In another embodiment, the irrigation device 100 may comprise a measurement mark 121 may be positioned on the tube 120 and at a point above the hose 140. Preferably, the purpose of the measurement mark 121 is to identify the depth of the irrigation device 100 when installed into the ground and may be used to assist the user by providing an indication as to how deep the irrigation device 100 is at below the ground 125. For instance, in one embodiment, the measurement mark 121 may be located on the tube 120 approximately between three to four inches above the hose 140. In a preferred embodiment, the measurement mark 121 may be located on the tube 120 at an area approximately 3½" inches above the hose 140. Once the irrigation device 100 is fed into the ground, the measurement mark may just be visible above the ground 125. The measurement mark 121 may be a marking such as a colored stripe (e.g., white line), tape, or other identifying means. Although FIG. 1 only shows a single measurement mark 121, several measurement marks may be used to indicate various depth levels. For example, one embodiment of the irrigation device 100 may utilize several measurement marks to show multiple increments in inches (e.g., three inches, four inches, five inches, etc . . . ).

The foregoing description of the specific embodiments will so fully reveal the general nature of the present disclosure that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the present disclosure have been described in terms of preferred embodiments, those skilled in the art will recognize that the embodiments of the present disclosure may be practiced with modification within the spirit and scope of the appended claims.

Unless otherwise stated, all measurements, values, ratings, positions, magnitudes, sizes, locations, and other specifications which are set forth in this specification, including in the claims which follow, are approximate, not exact. They are intended to have a reasonable range which is consistent with the functions to which they relate and with what is customary in the art to which they pertain.

The foregoing description of the embodiments has been presented for the purposes of illustration and description. While multiple embodiments are disclosed, still other embodiments will become apparent to those skilled in the art from the above detailed description. As will be realized, these embodiments are capable of modifications in various obvious aspects, all without departing from the spirit and scope of the protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that these embodiments not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:
1. An irrigation device comprising:
   a tube; and
   a hose;
   wherein at least a portion of a distal end of said tube extends into and is substantially surrounded by said hose;
   wherein said tube passes through a first end of said hose and wherein said first end of said hose is closed, such that said distal end of said tube is kept substantially in place and such that a liquid exiting from said distal end of said tube is substantially prevented from passing out of said first end of said hose;

wherein a second end of said hose is closed, such that said liquid is substantially prevented from passing out of said second end of said hose;

wherein said hose has a plurality of pores that allow said liquid to pass through to outside of said hose at a standard flow rate;

wherein said hose further comprises one or more fluting cuts that allow said liquid to seep out of said hose through said one or more fluting cuts only when one or more of said plurality of pores become clogged and a liquid pressure within said hose is greater than an outside pressure of said hose; and wherein said tube is configured to connect to an irrigation system such that said tube receives said liquid from said irrigation system.

2. The irrigation device of claim 1, wherein said one or more fluting cuts comprise three fluting cuts.

3. The irrigation device of claim 2, wherein a first fluting cut of said three fluting cuts is positioned approximately at said first end of said hose and wherein said first fluting cut is approximately vertical and extends downwards along a length of said hose for approximately one inch.

4. The irrigation device of claim 3, wherein a second fluting cut of said three fluting cuts is positioned approximately at a middle of said hose and wherein said second fluting cut is approximately vertical and extends downwards along said length of said hose for approximately one inch.

5. The irrigation device of claim 4, wherein a third fluting cut of said three fluting cuts is positioned approximately at said second end of said hose and wherein said third fluting cut is approximately vertical and extends upwards along a length of said hose for approximately one inch.

6. The irrigation device of claim 1, further comprising:
a first end cap that is between said hose and said tube, wherein said first end cap configured to be attached to said hose approximately at said first end of said hose such that said liquid is substantially prevented from passing out of said first end of said hose; and
a second end cap that is attached to said hose approximately at said second end of said hose such that said liquid is substantially prevented from passing out of said second end of said hose.

7. An irrigation device comprising:
a tube;
a hose; and
a copper pin;
wherein at least a portion of a distal end of said tube extends into and is substantially surrounded by said hose;
wherein said tube passes through a first end of said hose and wherein said first end of said hose is closed, such that said distal end of said tube is kept substantially in place and such that a liquid exiting from said distal end of said tube is substantially prevented from passing out of said first end of said hose;
wherein a second end of said hose is closed, such that said liquid is substantially prevented from passing out of said second end of said hose;
wherein said hose has a plurality of pores that allow said liquid to pass through to outside of said hose at a standard flow rate;
wherein said hose further comprises one or more fluting cuts that allow said liquid to seep out of said hose through said one or more fluting cuts only when one or more of said plurality of pores become clogged and a liquid pressure within said hose is greater than an outside pressure of said hose;
wherein said tube is configured to connect to an irrigation system such that said tube receives said liquid from said irrigation system; and
wherein said copper pin is substantially confined within said hose.

8. The irrigation device of claim 7, wherein said one or more fluting cuts comprise three fluting cuts.

9. The irrigation device of claim 8, wherein a first fluting cut of said three fluting cuts is positioned approximately at said first end of said hose and wherein said first fluting cut is approximately vertical and extends downwards along a length of said hose for approximately one inch.

10. The irrigation device of claim 9, wherein a second fluting cut of said three fluting cuts is positioned approximately at a middle of said hose and wherein said second fluting cut is approximately vertical and extends downwards along said length of said hose for approximately one inch.

11. The irrigation device of claim 10, wherein a third fluting cut of said three fluting cuts is positioned approximately at said second end of said hose and wherein said third fluting cut is approximately vertical and extends upwards along a length of said hose for approximately one inch.

12. The irrigation device of claim 7, further comprising:
a first end cap that is between said hose and said tube, wherein said first end cap configured to be attached to said hose approximately at said first end of said hose such that said liquid is substantially prevented from passing out of said first end of said hose; and
a second end cap that is attached to said hose approximately at said second end of said hose such that said liquid is substantially prevented from passing out of said second end of said hose.

13. The irrigation device of claim 7, wherein said copper pin is located approximately at said distal end of said tube.

14. An irrigation device comprising:
a tube; and
a hose;
wherein at least a portion of a distal end of said tube extends into and is substantially surrounded by said hose;
wherein said tube passes through a first end of said hose and wherein said first end of said hose is closed, such that said distal end of said tube is kept substantially in place and such that a liquid exiting from said distal end of said tube is substantially prevented from passing out of said first end of said hose;
wherein a second end of said hose is closed, such that said liquid is substantially prevented from passing out of said second end of said hose;
wherein said hose has a plurality of pores that allow said liquid to pass through to outside of said hose at a standard flow rate;
wherein said hose further comprises one or more fluting cuts that allow said liquid to seep out of said hose through said one or more fluting cuts only when one or more of said plurality of pores become clogged and a liquid pressure within said hose is greater than an outside pressure of said hose; and
wherein said tube is configured to connect to an irrigation system such that said tube receives said liquid from said irrigation system; and
wherein said tube comprises one or more measurement marks.

15. The irrigation device of claim 14, wherein said one or more fluting cuts comprise three fluting cuts;
wherein a first fluting cut of said three fluting cuts is positioned approximately at said first end of said hose and wherein said first fluting cut is approximately vertical and extends downwards along a length of said hose for approximately one inch.

16. The irrigation device of claim 15, wherein a second fluting cut of said three fluting cuts is positioned approximately at a middle of said hose and wherein said second fluting cut is approximately vertical and extends downwards along said length of said hose for approximately one inch.

17. The irrigation device of claim 16, wherein a third fluting cut of said three fluting cuts is positioned approximately at said second end of said hose and wherein said third fluting cut is approximately vertical and extends upwards along a length of said hose for approximately one inch.

18. The irrigation device of claim 17, further comprising:
   a first end cap that is between said hose and said tube, wherein said first end cap configured to be attached to said hose approximately at said first end of said hose such that said liquid is substantially prevented from passing out of said first end of said hose; and
   a second end cap that is attached to said hose approximately at said second end of said hose such that said liquid is substantially prevented from passing out of said second end of said hose.

19. The irrigation device of claim 14, wherein said one or more measurement marks are positioned on said tube above said first end of said hose.

20. The irrigation device of claim 19, further comprising a copper pin; wherein said copper pin is located approximately at said distal end of said tube and is entirely enclosed within said hose.

\* \* \* \* \*